United States Patent [19]

Rhoades et al.

[11] Patent Number: 4,891,916
[45] Date of Patent: Jan. 9, 1990

[54] OSCILLATORY OR TRANSLATIONAL TABLE FOR MACHINE TOOLS

[75] Inventors: Lawrence J. Rhoades, Pittsburg; William D. Jenkins, North Huntingdon, both of Pa.

[73] Assignee: Extrude Hone Corporation, Iwrin, Pa.

[21] Appl. No.: 265,935

[22] Filed: Nov. 2, 1988

Related U.S. Application Data

[63] Continuation-in-part of Ser. No. 107,306, Oct. 13, 1987, abandoned.

[51] Int. Cl.⁴ .............................................. B24B 47/02
[52] U.S. Cl. .................................... 51/230; 51/240 R; 51/60; 74/86; 248/638
[58] Field of Search ............. 51/237 M, 217 S, 240 R, 51/64, 60, 58, 230 R; 74/86; 269/56; 248/638, DIG. 13, 605

[56] References Cited

U.S. PATENT DOCUMENTS

| | | | |
|---|---|---|---|
| 990,384 | 4/1911 | Pfanne | 51/230 |
| 2,828,949 | 4/1958 | Paladino et al. | 74/86 |
| 3,435,562 | 4/1969 | Maillet | 51/60 |
| 3,748,790 | 7/1973 | Pizzarello et al. | 51/58 |
| 3,875,702 | 4/1975 | Yacos | 51/58 |

FOREIGN PATENT DOCUMENTS 0761028 9/1980 U.S.S.R. ................................ 74/86

Primary Examiner—Robert Rose
Attorney, Agent, or Firm—Waldron & Associates

[57] ABSTRACT

An orbital table assembly having a top plate which can be made to orbit or translate in a path without rotating, and having a fixed base plate under said top plate and a linkage plate between the two other plates, while an orbiting cam secured to the top plate imparts orbital motion thereto. A first set of arms is provided to secure the linkage plate to the base plate to prevent rotation of the linkage plate while permitting linear lateral movement in one direction only, and a second set of arms is provided secured to secure the top plate to said linkage plate to prevent rotation of said top plate while permitting linear lateral movement in a single direction perpendicular to the aforesaid direction.

6 Claims, 4 Drawing Sheets

OSCILLATORY OR TRANSLATIONAL TABLE FOR MACHINE TOOLS

This application is a continuation-in-part of application Ser. No. 107,306, filed Oct. 13, 1987, and now abandoned.

This invention relates generally to an orbital table and to the mechanism associated therewith which converts rotary motion input into a planar orbital motion without rotation. More particularly, this invention relates to a simple, reliable, and inexpensive orbital table for use on, or in conjunction with, any application where orbital motion is desired, such as machine tools where orbital or translational motion of a workpiece, working tool or both is utilized to produce simple or complex machined shapes.

BACKGROUND OF THE INVENTION

There are a number of metal machining processes where it is essential that the working tool and/or workpiece follow a defined by a translational or orbital path as the tool works a given workpiece surface. For example, jig boring or grinding machines are well known machine tools where a boring, grindirg or polishing wheel, rotating on its own axis, is further made to revolve in a planetary or orbital path in the finishing of circular holes or recesses within metal workpieces. By placing the workpiece on an orbital table, the combined orbital motions of the working tool and the workpiece makes possible the working of complex surfaces other than round.

More recently, orbital grinding machines have come into use which do not utilize rotating grinding wheels, but rather being a tool and workpiece together, at least one of which is oriting without rotation against the other. In this application, the working tool is usually formed of a rather hard material and typically has a three dimensional configuration in it working face. By orbiting either the tool or the workpiece, or both, while the two are in contact and biased against each other, using a rather small radius of orbit, the negative configuration of the tool is worked into the workpiece. Because of the orbital motion of either the tool or workpiece, the resulting machined configuration in the workpiece cannot be of an identical size to that of the tool. However, rather complex, intricate and exacting three dimensional configurations can be produced by proper allowance for the orbital action between the tool and the workpiece.

Other recent and advanced machining processes, such as electrical discharge machining, either sequentially or in multifunctional singular operations are utilized which in some applications depend on orbital motion of the work tool and/or workpiece to machine shapes not attainable in any other practical way and at levels of finish and accuracy which are exceptional.

The machine tools and techniques mentioned above, usually utilize conventional X-Y tables which are expensive and tend to be rather large due to the complex motion creating hardware. The complex nature of the hardware leads to a rather high power loss and accuracy factors that are less than desired.

SUMMARY AND OBJECTS OF THE INVENTION

This invention relates to a new simple, reliable and low cost translational and orbital table for use in any application where such tables are currently utilized, and in particular for use on, or in conjunction with, machine tools, to which a workpiece can be affixed and made to orbit in an orbital path or otherwise translated without rotation. Because of its low cost, the orbital table of this invention will find particular utility in those machining operations where all that is needed is to have a work table that will orbit in a circular path. In addition to its being greatly simplified and lower in cost, as compared to conventional X-Y tables, the orbital or translational table of this invention provides added advantages of being more accurate, lighter in weight, capable of being produced at considerable size reductions with a comparatively low profile form and is characterized by a lower power loss than conventional prior art tables. The orbital table of this invention is fabricated to effect a given movement, and accordingly has no mechanism or adjustments for changing the movement which will adversely affect the accuracy of movement. In addition, the orbital table of this invention does not utilize any sliding linkage as is found in most X-Y tables, which tend to loosen quickly with use to further adversely affect the accuracy of the rotation and precision of control. Accordingly, the orbital table of this invention provides the added advantage of maintaining the desired fixed motion without loss in accuracy due to the wearing of siding linkage, and without any need for concern that the adjustments could be inadvertently moved to unknowingly alter the movement, and therefore without any need to periodically check the adjustments to assure the proper settings.

Accordingly, it is an object of this invention to provide a new, improved and simplified translational table for machine tool applications.

It is another object of this invention to provide a simple, reliable and inexpensive orbital table having a radius of orbit for the most demanding of orbital table applications, such as machine tool applications, and in particular orbital grinding and polishing machines.

Another object of this invention is to provide a new light weight translational and orbital table for machine tools and other applications, which is much simpler in construction than the conventional X-Y tables, does not have any complex mechanism for adjusting to different orbital motions, and can accordingly be produced with considerable size reductions and low profile as compared to conventional X-Y tables.

A further object of this invention is to provide an orbital table that will maintain a fixed, preset radius of orbit which does not utilize any sliding linkage that will loosen in operation and adversely affect the accuracy or the orbital motion.

Still another object of this invention is to provide a translational and orbital table which is simpler, more reliable and less expensive than a conventional X-Y table.

A still further object of this invention is to provide a translational and orbital table which exhibits a lower power loss and an improved accuracy of movement as compared to prior art X-Y tables.

DESCRIPTION OF THE PREFERRED EMBODIMENT

Figure 1:
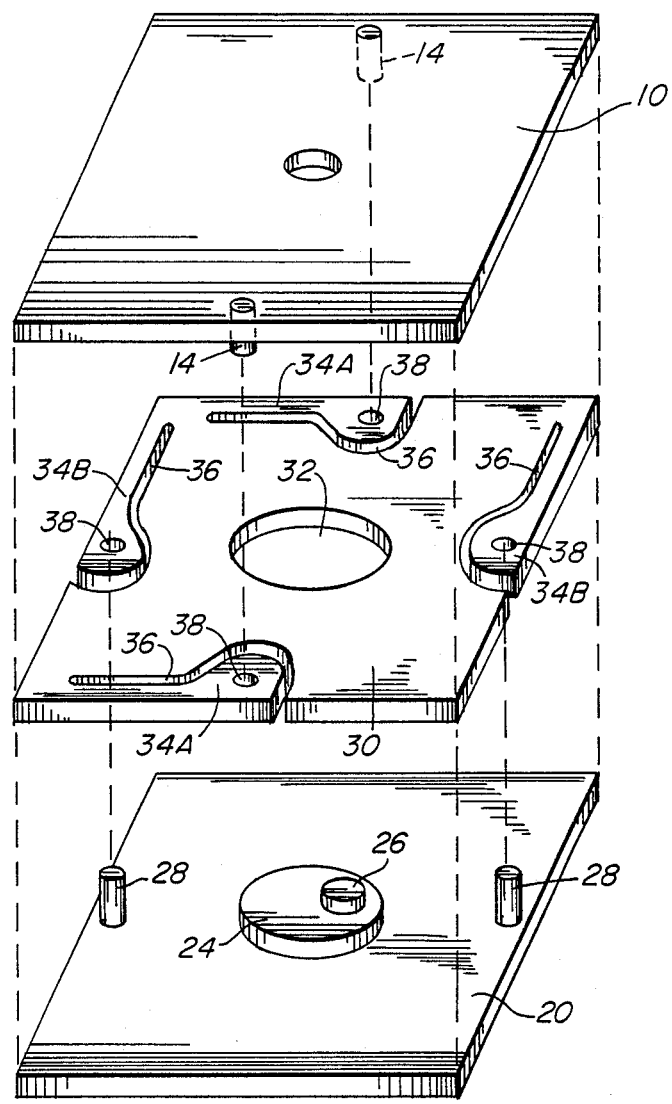
FIG. 1 is an isometric view of a preferred embodiment of this invention illustrating the three major components of the orbital table in a spaced apart relationship.
Figure 2:
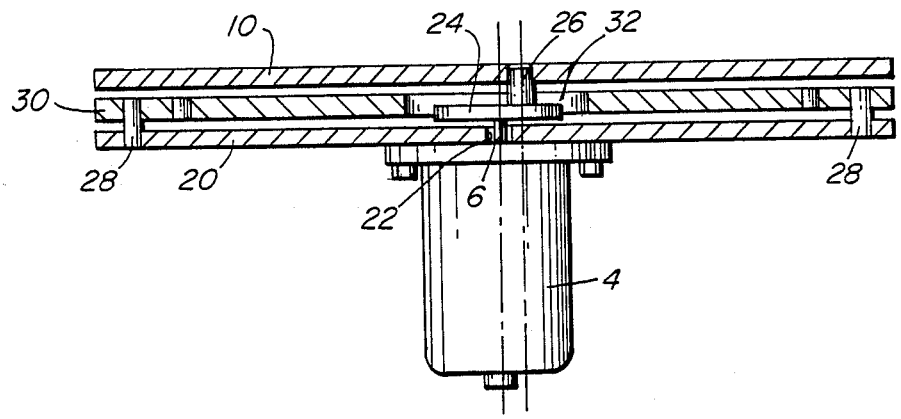
FIG. 2 is a sectional side view of the orbital table illustrated in FIG. 1 with the section taken at line 2—2 depicted in FIG. 3.

With reference to FIG. 1, one of the simplest and a preferred embodiment of this invention consists merely of three essential plate components, namely a tool plate 10 at the top, a drive plate 20 at the bottom and a linkage plate 30 therebetween. Drive plate 20 at the bottom, forms the base member for the orbital table and should be secured and fixed as the application dictates. A rotational drive means, such as an electric motor 4 is secured to the underside of drive plate 20 with its arbor 6 extending vertically upward through hole 22 in the center of, and perpendicular to, the the upper surface of drive plate 20. A drive spindle 24, having a relatively short cylidrical boty, is secured to the motor arbor such that activation of electric motor 4 will cause the rotation of drive spindle 24 in a plane parallel to and just above the top surface of drive plate 20. A spindle cam 26 is secured to the top surface of drive spindle 24 with its axis offset a predetermined distance from the drive spindle axis. A pair of parallel, link pins 28 are attached to the upper surface of drive plate 20 diametrically opposed on either side of drive spindle 24 with their axis perpendicular to the top surface of drive plate 20 and thus parallel to the axis of rotation of drive spindle 24.

Linkage plate 30, which may, but not essentially, have the same peripheral dimensions as drive plate 20, is provided with a hole 32 through the center thereof, and with a flex-arm 34 on each side of the four sides of the rectangular plate. As can be seen from FIG. 1, the flex-arms 34 are formed in this embodiment by cutting slots 36 through plate 30 parallel to each edge of the plate 30, such that an elongated portion on exact edge of the plate forms a flex arm 34 which is attached at only one end of the plate 30 near the corner of thereof. The section of metal where the flex-arms 34 meet linkage plate 30 must be thin enough to permit a modest lateral deflection of flex-arms 34 relative to linkage plate 30. Accordingly, two pairs of parallel flex-arms 34A and 34B are formed on opposite sided of plate 30, such that each pair is perpendicular to the other. Each pair of parallel flex-arms 34A and 34B are diametrically opposed on either side of hole 32 at an angle of 90 degrees to the other pair. Each flex-arm 34 is provided with a hole 38 through the free end thereof perpendicular to the surface of plate 30, with the axis thereof lying in a vertical plane passing through the axis of rotation of said drive spindle 24. Flex-arms 34B, and accordingly linkage plate 30 are attached to drive plate 20 by fitting the holes 36 therethrough over link pins 28 on drive plate 20, and accordingly fitting hole 32 over drive spindle 24. Preferably, link pins 28 should fit into holes 36 as tight as is necessary to prevent any pivotal action of flex-arms 34B on pins 28. Conversely, hole 32 should be snug but loose enough on drive spindle 24 to permit rotation of drive spindle 24 without interference.

Tool plate 10, which is the orbiting plate, and which may, but not essentially, have the same peripheral dimensions as plates 20 and 30, is provided with a hole through the center which in essence forms a spindle cam bearing 12. A pair of parallel link pins 14 are secured to the underside of tool plate 10 diametrically opposed on either side of spindle cam bearing 12 and spaced so that they will mate with the holes through flex-arms 34A in linkage plate 30. Accordingly, tool plate 10 is secured to linkage plate 30 by inserting link pins 12 into holes 34A and such that spindle cam 26 is rotatably fitted into spindle cam bearing 12. Since spindle cam 26 is not centered on drive spindle 24 or drive plate 20 one or both pairs of flex-arms 34 will have to be deflected somewhat in order to get spindle cam bearing 12 over spindle cam 26. As noted above for flex-arms 34B, flex-arms 34A may be pivotally or securely connected on link pins 12.

In operation, the above described orbital table is activated by activating the rotational drive means, e.g. electric motor 4 secured to the bottom of drive plate 20. This of course will cause rotation of drive spindle 24 on its own axis, while spindle cam 26, which is offset from the drive spindle axis, will oscillate in an orbital path around the spindle axis. Since drive plate 20 is secured in a stationary position, suitable clearance must be provided at hole 22 to permit the free rotation of arbor 8 extending therethrough. As noted above, linkage plate 30 is secured to drive plate 20 via link pins 28, so that linkage plate 30 is likewise not free to rotate. Similarly, tool plate 10 is secured to linkage plate 30 via link pins 14, so that tool plate 10 cannot rotate either. However, since orbiting spindle cam 26 is inserted into spindle cam bearing 12 through the center of tool plate 10, it should be apparent that tool plate 10 will not remain stationary, but rather must move in unison with the orbital movement of spindle cam 26. Such an orbital motion without rotation is permitted by the deflection of flex-arms 34.

Figure 3:
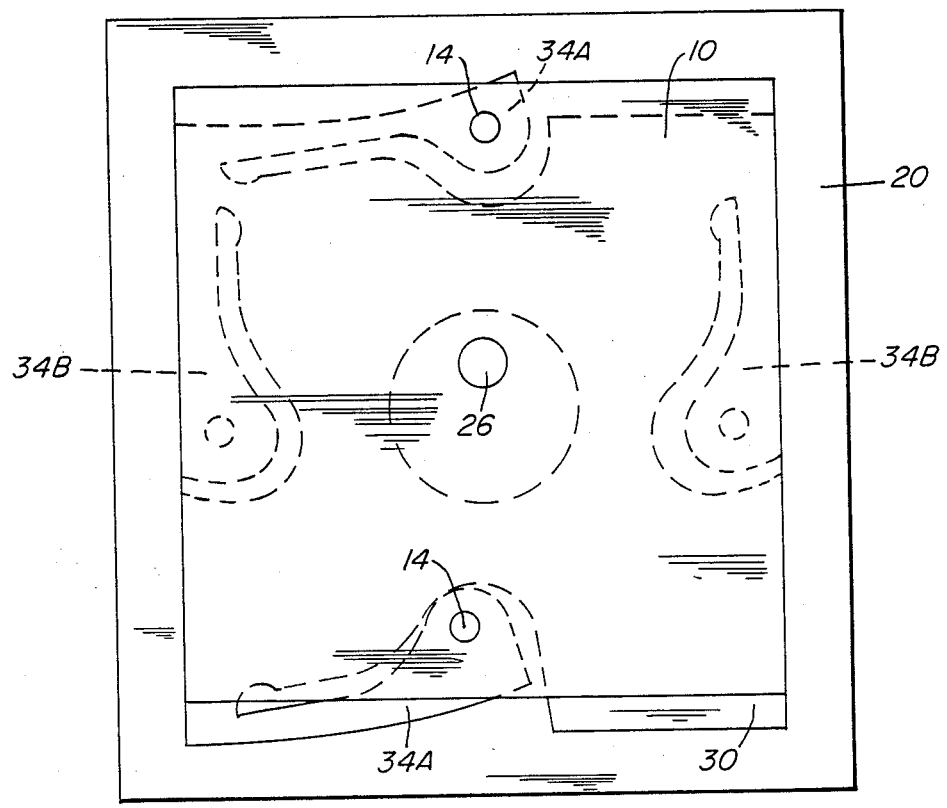
FIGS. 3, 4 and 5 are top views of an orbital table substantially as shown in FIG. 1 and 2 illustrating three different positions of the orbital movement. Unlike FIGS. 1 and 2, the base plate in these figures is made somewhat larger than the tool and linkage plate to better illustrate the relative displacement of the plates during operation.
Figure 4:
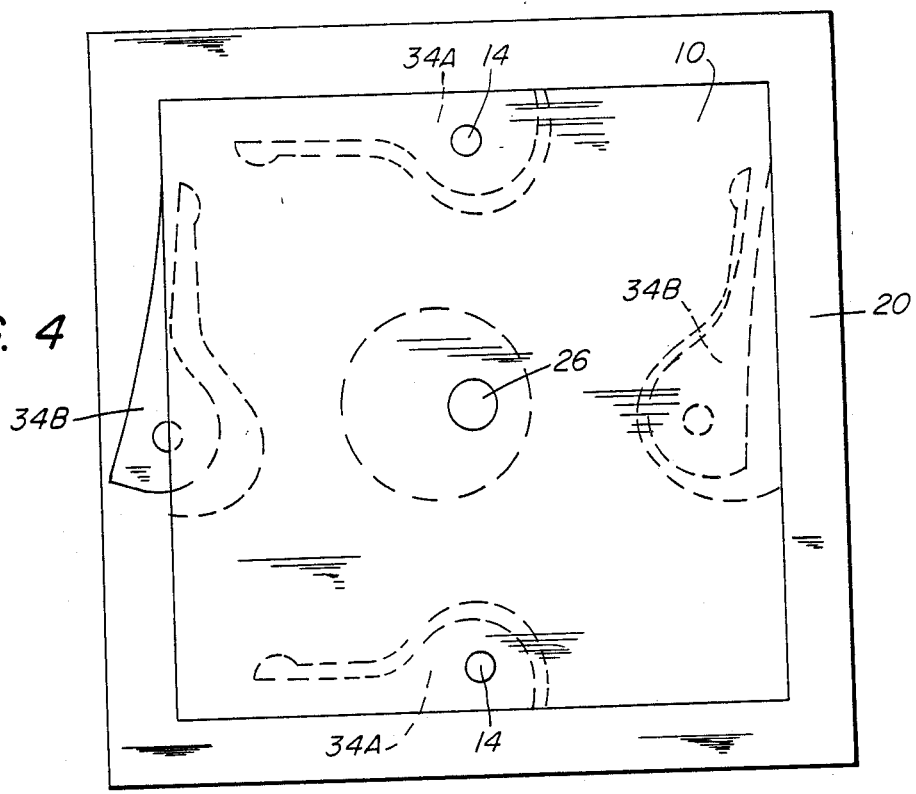
Figure 5:
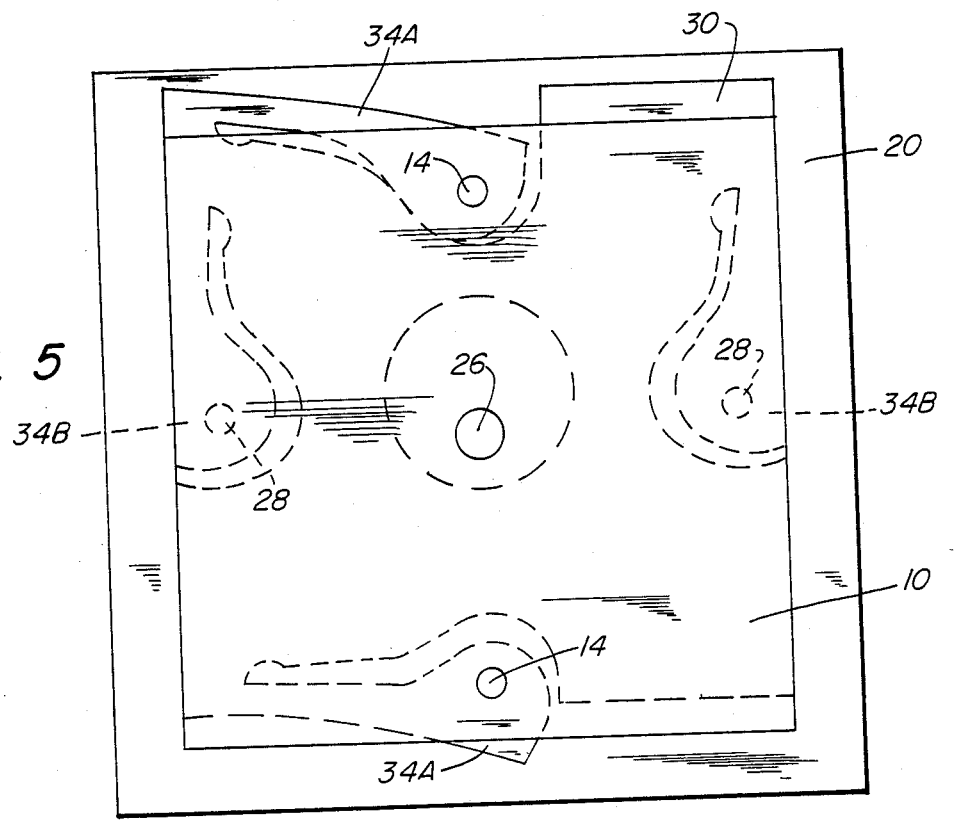

As may be apparent from a close look at the linkage of flex-arms 34, tool plate 10 cannot rotate, but oscillates in an orbital path as depicted in FIGS. 3, 4 and 5. With reference to FIG. 3, which is a top view of the orbital table, it can be seen that when spindle cam 26 is at the twelve O'clock position, tool plate 10 is positioned as far to the top side as it will go, that is, top side as viewed in the drawings. To be moved to that position, link pins 14 will also be moved to the top side along with tool plate 10 causing flex arms 34A to be elastically deflected such that the free end thereof is deflected towards the top by an equal amount. Assuming a clockwise rotation of drive spindle 24, spindle cam 26 will move from the twelve O'clock position as shown in FIG. 3 by rotating towards the three O'clock position. Tool plate 10 will of course follow the same path but without rotating. Accordingly, as spindle cam 26 rotates from the twelve to the three O'clock position, flex-arms 34A start retracting to their normal undeflected position. The movement of tool plate 10 to the right, however, as opposed to top and bottom movement, cannot be accommodated by any deflection of flex-arms 34A. Instead, link pins 14 will pull the entire body of linkage plate 30 to the right, and thus flex-arms 34B are elastically deflected to the left as the body of linkage plate 30 moves to the right. When spindle cam 26 is in the three O'clock position, flex-arms 34A will have completely returned to their normal undeflected position, while flex-arms 34B, will be elastically deflected to their furthest left position, as both tool plate 10 and linkage plate 30 are moved to this furthest right position, as depicted in FIG. 4. In a like fashion, as spindle cam 26 rotates from the three to the six O'clock position, the following quarter orbital movement of tool plate 10 is permitted by the returning movement of flex-arms 34B to their undeflected position and the deflection of interaction arms 34A in a downward direction. FIG. 5 illustrates the relative positions when spindle cam 26 is in the six O'clock position. It can be seen that all left and right displacement of tool plate 10 is accommodated by the deflection of flex-arms 34A as tool plate 10 moves left and right with respect to linkage plate 30. On the other hand, all top and bottom displacement of tool plate 10 is accommodated by the deflection of link pins 34B as tool plate 10 and linkage plate 30 move jointly towards the top or bottom with respect to drive plate 20. Since linkage plate 30 does move with respect to drive plate 20, hole 32 through the center thereof must be large enough to accommodate such movement without obstruction. It should be noted that the spindle cam offset as shown in the drawings was made significantly large so that relative displacements of the components would be readily apparent from viewing the drawings. While such displacements would be within the scope of this invention, smaller offsets would be more common, particularly in orbital grinding where the radius of orbits are typically within the range of 0.020 to 0.050 inch.

Figure 6:
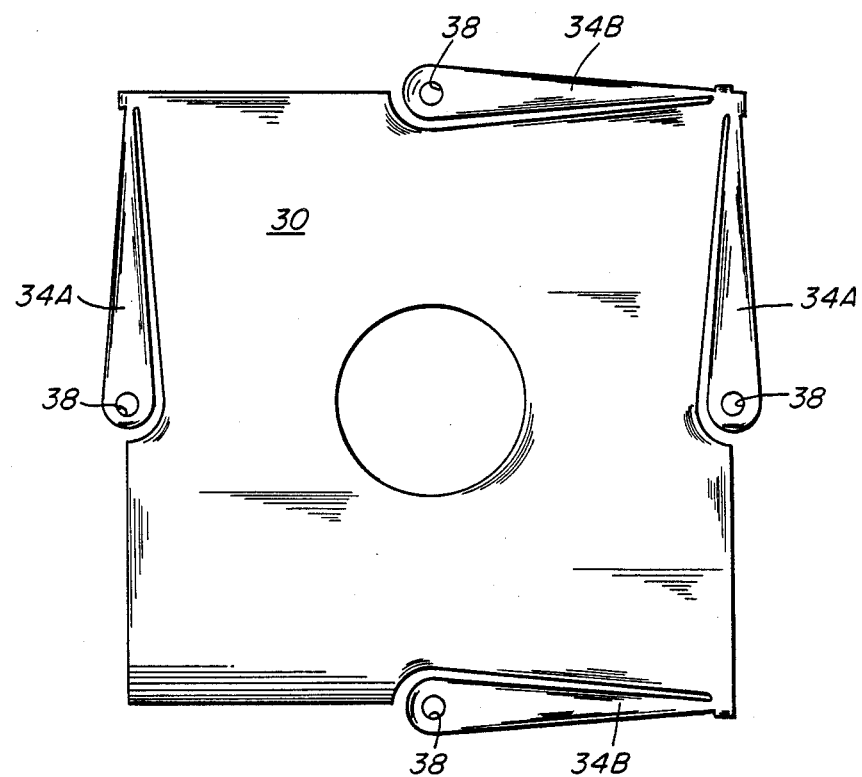
FIG. 6 is a cut-away top view illustrating a modified flex-arm.

As previously noted, holes 36 should fit tightly onto link pins 28 for the purpose of preventing any pivotal rotation of flex-arms 34 about pins 28. If flex-arms 34 are permitted to pivot about pins 28, particularly in the embodiment shown in FIGS. 1-5, the tool plate 10 will be caused to wobble somewhat in its orbital path. On the other hand, if the axes of link pins 28 are aligned through the center of flex-arms 34 and such alignment is perpendicular around the four sides of the table, as shown in FIG. 6, then flex-arms 34 can be allowed to pivot on link pins 28 without causing any wobbling. It should be apparent that the power loss in operating the table will be a function of the section of metal "x", as shown in FIG. 1. Accordingly the thinner that section is, for any given steel plate, the more easily the flex-arms will be able to be deflected and the lower the power loss will be.

It should be apparent that the above described embodiment of this invention is ideal in its simplicity in that the entire unit is fabricated from simple plate and rod stock with very simple fabrication and machining requirements. It should be apparent that a table of very low profile can be produced by minimizing the thickness the the plate stock used in its manufacture, and that the absence of complex hardware would readily permit the other dimensions of the table to be reduced or enlarged as desired. In addition, the power loss can be greatly minimized by fabricating the plates such that the flex-arm can be easily deflected, i.e. by minimizing the section thickness where the flex-arms are deflected. In addition to the above advantages, it is obvious that numerous modifications and different embodiments could be utilized without departing from the spirit of the invention. For example, it should be obvious, of course, that the preset radius of orbit can be varied from one table to the next by merely changing the offset distance of spindle cam 26 from the axis of spindle 24. For added life, it should also be obvious that spindle cam 26 could be journaled in a ball or roller bearing instead of the solid bearing 12 as shown. Drive plate 20 could also be produced in many different forms depending on the application where the orbiting table will be utilized, and could in fact be eliminated provided some sort of base member is utilized to support the upper two plates 10 and 30, and to provide a flexible coupling to the free ends of flex-arms 34B to prevent plate 30 from rotating. Linkage plate 30 could also be fabricated in many different forms, as could flex-arms 34.

Considerable modifications could be made to the flex-arms 34 which could be separate rod type components pivotally affixed at both ends with any form of linkage member that will maintain them in the spaced relationship as shown. In addition, two or more aligned flex-arms could be utilized in place of each flex-arm 34 as shown. All that is necessary is that the arms or rods be rigid so as to prevent rotation of tool plate 10, but yet capable of readily deflecting or pivoting in the direction perpendicular thereto to accommodate the orbital motion. On the other hand, it should be apparent that all that is really necessary is to have a deflecting means that will secure tool plates 10 to linkage plate 30 and secure linkage plate 30 to base plate 20 sufficiently to prevent them from rotating but yet will deflect laterally to allow lateral movement of linkage plate 30 in one direction while allowing lateral movement of tool plate 10 in a direction perpendicular to the aforesaid direction.

While tool plate 10 is shown to have a flat upper surface for simplicity, it is obvious that some sort of machining may be necessary on the top surface in order to attach some sort of workpiece holding tool or the like.

Since the circular path of orbit of tool plate 10 is set and defined by the circular path of orbit of spindle cam 26 it is obvious that translational paths other than orbital, such as an oval path, for example, could be created by providing a spindle cam which orbits in any such noncircular path. this could be done by providing a cam which changes its distance from the spindle axis as the spindle rotates. This could be effected by a cam which is slideable with respect to the spindle axis and then providing a stationary template that will guide the cam in a noncircular path as defined by the template.

What is claimed is:

1. An orbital table assembly having a top plate which can be made to translate about an axis without rotating, comprising a fixed base member, a top plate over said fixed base member, a linkage member interposed between said base member and said top plate, a rotatable cam member rotatably secured to said top plate such that rotation of said cam member will cause said top plate to orbit in a translational path offset from the axis of translation, means for rotating said cam member, a first set of parallel deflecting arms, one end of which are connected to said linkage member and the other end connected to said base member at a point opposed on either side of the axis of translation, a second set of parallel deflecting arms perpendicular to said first pair of deflecting arms with one end thereof connected to said linkage member and the other end connected to said top plate at a point opposed on either side of the axis of translation, each pair of said deflecting arms oriented in a plane perpendicular to the axis of translation and aligned transversely to said axis, said deflecting arms thus preventing rotation of said top plate but eflecting to permit the translational motion thereof.

2. An orbital table according to claim 1 wherein said base member consists of a base plate parallel to said top plate and having said cam member rotatably attached thereto.

3. An orbital table according to claim 1 wherein said linkage member comprises a rectangular plate member.

4. An orbital table according to claim 3 wherein said deflecting arms consist of elongated portions of said plate member formed by cutting slots parallel to each edge of said plate member so that one end of each elongated portion remains deflectably attached to said plate member near a corner thereof while the other end of each elongate portion is free to deflect towards or away from said plate member.

5. An orbital table according to claim 4 wherein the free ends of one pair of parallel elongated portions are secured to said base member while the free ends of the other pair of parallel elongated portions are secured to said top plate.

6. An orbital table according to claim 5 wherein said free ends of one one pair of parallel elongated portions are secured to pins attached to said base member, while said free end of the other pair of parallel elongated portions are secured to pins attached to said top plate

* * * * *